(12) United States Patent
Gouge et al.

(10) Patent No.: US 6,373,984 B1
(45) Date of Patent: *Apr. 16, 2002

(54) SYSTEM AND METHOD FOR DETECTING PATTERNS OR OBJECTS IN A DIGITAL IMAGE

(75) Inventors: James Gouge; Sally Gouge, both of Summerville, GA (US)

(73) Assignee: Indigo Medical Incorporated, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,929

(22) Filed: Mar. 16, 1999

(51) Int. Cl.[7] .................................................. G06K 9/68
(52) U.S. Cl. ...................................................... 382/226
(58) Field of Search ................................ 382/155, 226, 382/227, 305, 306, 225, 157; 707/3, 102, 103; 706/15, 41, 42, 27, 33, 26

(56) References Cited

U.S. PATENT DOCUMENTS

| | | | | |
|---|---|---|---|---|
| 4,953,228 A | * | 8/1990 | Shigemitsu et al. | 382/125 |
| 4,979,126 A | * | 12/1990 | Pao et al. | 706/25 |
| 5,267,328 A | * | 11/1993 | Gouge | 382/128 |
| 5,515,477 A | * | 5/1996 | Sutherland | 706/41 |

OTHER PUBLICATIONS

"Radar Image Analysis Utilizing Junctive Image Metamorphosis", Proc. SPIE AeroSense '98, vol. 3370 (1980).
"Neuroscience Yields New Tools For Image Processing" by James O. Gouge, Sally B. Gouge, and Peter Krueger, Computers and Software, Laser Focus World, Jul. 1998.
James Albus A Model of the Brain for Robot Control Part I: Defining Notation Jun. 1979 10, 12, 15–18, 20, 24, 26, 28, 30, 32, 34.
James Albus A Model of the Brain for Robot Control Part II: Neurological Model Jul. 1979 54, 56–58, 60–61, 64, 66, 68, 69, 70–72, 74, 76–77, 80, 82, 84, 86, 88, 90, 92–95.
James Albus A Model for the Brain for Robot Control Part III: A Comparison of the Brain and our Model Aug. 1979 66–68, 70, 72, 74, 76, 78, 80.

* cited by examiner

*Primary Examiner*—Andrew W. Johns
*Assistant Examiner*—Seyed Azarian (57) ABSTRACT

An image analysis system detects objects and patterns within a digital image. The system includes a synaptic link generator, a knowledge element (knixel) identifier, a theme identifier, and a corresponding theme/knixel associations knowledge base. The synaptic link generator includes a determinant extractor for computing a set of determinants for a plurality of pixels within the digital image. The synaptic link generator uses the determinants to generate a synaptic link for each pixel having a set of determinants and a knowledge element identifier is stored at an address corresponding to each synaptic link. The theme identifier evaluates associative links in a theme knowledge base to determine whether the knowledge elements or other themes identified as being present in the digital image conform to a logical relationship defined by the associative links. If the theme identifier determines the logical relationship between the knowledge elements or other themes defined by associative links for a theme are present in the digital image, a theme is deemed present in the image and an action associated with the theme is performed. These actions include the substitution of a pixel value for pixels corresponding to the knowledge elements associated with a theme to highlight or otherwise redefine the visual appearance of the pixels within the image. The actions also include an action to provide access to an external resource from the image analysis system, or to link the theme identified by the associative links evaluated by the theme identifier to other knowledge elements or themes stored within the knowledge base.

17 Claims, 12 Drawing Sheets

TYPICAL RADIAL PIXEL ARRAY

SYNAPTIC POINTER GENERATION EXAMPLE

```
BIT      2 2 2 2 1 1 1 1 1 1 1 1 1 1 0 0 0 0 0 0 0 0 0 0
POSITION 3 2 1 0 9 8 7 6 5 4 3 2 1 0 9 8 7 6 5 4 3 2 1 0

DET 0 = 14                                        1 1 1 0  ⎱ STORE
   ACCUM 0----------------------------------0 1 1 1 0      ⎰ L.S.2
   ACCUM 0--------------------------------0 1 1 1 0 0      ⎱
                                                           ⎰ EXOR
DET 1 = 17                                      1 0 0 0 1
   ACCUM 0--------------------------------0 1 0 1 0 0 1    ⎱ L.S.2
   ACCUM 0------------------------------0 1 0 1 0 0 1 0 0  ⎰
                                                           ⎱ EXOR
DET 2 = 25                                    1 1 0 0 1
   ACCUM 0------------------------------0 1 0 1 1 1 1 0 1  ⎱ L.S.2
   ACCUM 0----------------------------0 1 0 1 1 1 1 0 1 0 0 ⎰
                                                           ⎱ EXOR
DET 3 = 8                                          1 0 0 0
   ACCUM 0----------------------------0 1 0 1 1 1 1 1 0 0   ⎱ L.S.2
   ACCUM 0--------------------------0 1 0 1 1 1 1 1 0 0 0 0 ⎰
                                                           ⎱ EXOR
DET 4 = 71                                    1 0 0 0 1 1 1
   ACCUM 0--------------------------0 1 0 1 1 1 0 1 1 0 1 1 1 ⎱ L.S.2
   ACCUM 0------------------------0 1 0 1 1 1 0 1 1 0 1 1 1 0 0 ⎰
                                                           ⎱ EXOR
DET 5 = 24                                          1 1 0 0 0
   ACCUM 0------------------------0 1 0 1 1 1 0 1 1 0 0 0 1 0 0 ⎱ L.S.2
   ACCUM 0----------------------0 1 0 1 1 1 0 1 1 0 0 0 1 0 0 0 0 ⎰
                                                           ⎱ EXOR
DET 6 = 7                                                1 1 1
   ACCUM 0----------------------0 1 0 1 1 1 0 1 1 0 0 0 1 0 1 1 1 ⎱ L.S.2
   ACCUM 0--------------------0 1 0 1 1 1 0 1 1 0 0 0 1 0 1 1 1 0 0 ⎰
                                                           ⎱ EXOR
DET 7 = 11                                        1 0 1 1
   ACCUM 0--------------------0 1 0 1 1 1 0 1 1 0 0 0 1 0 1 0 1 1 1
                                    ↓
                           SYNAPTIC POINTER
                                    ↓
         0---------------0 1 0 1 1 1 0 1 1 0 0 0 1 0 1 0 1 1 1
```

KNOWLEDGE ELEMENT (KNIXEL) ARRAY ENTRY [65535]

| ACTION | OBJECT/LINK TO OBJECT |
|---|---|
| 3 3 2 2 2 2 2 2<br>1 0 9 8 7 6 5 4 | 2 2 2 2 1 1 1 1 1 1 1 1 1 1 0 0 0 0 0 0 0 0 0 0<br>3 2 1 0 9 8 7 6 5 4 3 2 1 0 9 8 7 6 5 4 3 2 1 0 |

THEME ARRAY ENTRY [65535]

| ACTION | OBJECT/LINK TO OBJECT |
|---|---|
| 3 3 2 2 2 2 2 2<br>1 0 9 8 7 6 5 4 | 2 2 2 2 1 1 1 1 1 1 1 1 1 1 0 0 0 0 0 0 0 0 0 0<br>3 2 1 0 9 8 7 6 5 4 3 2 1 0 9 8 7 6 5 4 3 2 1 0 |

THEME ASSOCIATION LIST ENTRY

| | FORM | THRESHOLD/<br>WEIGHT | KNIXEL/THEME No. |
|---|---|---|---|
| 3<br>1 | 3 2 2 2 2 2 2<br>0 9 8 7 6 5 4 | 2 2 2 2 1 1 1 1<br>3 2 1 0 9 8 7 6 | 1 1 1 1 1 1 0 0 0 0 0 0 0 0 0 0<br>5 4 3 2 1 0 9 8 7 6 5 4 3 2 1 0 |

↳TYPE
 0 = KNIXEL
 1 = THEME

FIG. 12

SYSTEM AND METHOD FOR DETECTING PATTERNS OR OBJECTS IN A DIGITAL IMAGE

FIELD OF THE INVENTION

This invention relates to digital image processing, and more particularly, to pattern and object recognition in a digital image.

BACKGROUND OF THE INVENTION

Digital image processing systems that recognize patterns in images and detect objects within an image are well known. These systems use various conventional processing techniques for both of these tasks. For example, some of these systems are strictly mathematically based and use such algorithms as morphological processing, wavelet algorithms, convolutions, and the like while other systems use variations on neural net and fuzzy logic technologies. These systems have been used in a variety of image analysis environments and applications such as medical images obtained with ultrasound, x-ray, CAT scan, MRI and other known medical imaging systems to examine body tissue for the detection of abnormalities such as cancer. These systems have also been used in military image analysis of images generated by radar, sonar, infrared and other imaging systems to extract features such as terrain, infrastructure and the like and to detect specific targets such as tanks and other military vehicles, weaponry, camouflaged bunkers and the like. These systems have also been used in various commercial and scientific applications.

These previously known image analysis systems are extremely limited in the image environment in which they properly function. Additionally, the algorithms used by these systems to process images are brittle. That is, they are typically rendered ineffective by slight variations in image quality, image resolution, image noise level and many other factors. Consequently, these systems cannot be used for general pattern recognition and object detection across a wide range of applications, environments, or imaging modalities.

One of the most difficult image analysis environments is the ultrasound imaging of in vivo body tissues. The images of in vivo tissue generated by ultrasound equipment contain a high number of line variations and edge patterns, the detection of which is made difficult by the signal noise present in that imaging environment. Thus, image analysis based on a comparison of images of the same area of interest taken at different times, as typically done in systems analyzing ultrasound images, is inherently difficult.

With systems that use images to detect the presence of cancer, limitations arise from the knowledge base required by such systems and the computational resources available for image comparison. For example, neural networks may be used for image analysis systems; however, these systems require extensive training through the presentation of numerous images to the neural network. Because the images are presented to the system without intelligent insight as to the content of the images, the system tends to only learn statistically significant events and ignores image events less frequently encountered. For example, the submission of images of tissue having a particular abnormal cell structure indicative of some cancer may be learned by a neural network system to identify that structure and similar structures in tissue. However, a less statistically significant variant of that structure that may also indicate cancer would not be incorporated in the knowledge base of the system.

Consequently, the system may not detect these variant structures which are also indicative of cancer. Another problem with previously known image analysis systems is the amount of resources required for image processing. The elements for processing images on a pixel by pixel basis can be significant as the number of pixels contained within an image increase. In some cases, the storage of multiple images so they may be later compared to one another can be prohibitive or require archival systems that increase the time required for image retrieval and processing.

What is needed is an image processing system and method that recognizes patterns and detects objects in images without requiring adaptation of the system to a particular application, environment, or image content.

What is needed is an image analysis system and method that maintains consistent image evaluation which is independent of variation in image modality, resolution, noise level, quality, and other image factors.

What is needed is an image analysis system and method for cancer detection that accurately analyzes in vivo images in a wide variety of applications.

What is needed is an image analysis system and method that simplifies the processing of images from the pixel by pixel comparisons performed by known systems.

What is needed is an image analysis system and method that incorporates within a knowledge base variant structures of an object or pattern that are not statistically significant.

What is needed is an image analysis system and method for feature extraction and target recognition in various military, commercial and scientific digital images.

SUMMARY OF THE INVENTION

The above limitations of previously known image processing systems are overcome by a system and method operating in accordance with the principles of the present invention. An image processing system made in accordance with the principles of the present invention includes a knowledge base of themes with the themes being coupled to knowledge elements by associative links, a synaptic link generator for generating synaptic links for pixels in a digital image, the synaptic link being used to identify a knowledge element for a corresponding pixel and a theme identifier for evaluating associative links for a plurality of knowledge elements corresponding to a theme to determine whether the corresponding theme is present in a digital image. This system may be used to analyze a digital image for patterns and objects in many different applications, environments, and imaging modalities.

In the system of the present invention, the synaptic link generator uses a data mask to select pixels from an image and generates a synaptic link from determinants generated for each pixel. Preferably, these determinants are generated from data for pixels lying in radials extending from the pixel under investigation. A plurality of determinants are preferably used to generate a synaptic link that identifies pattern information surrounding the pixel under investigation. These determinants encode pattern data in the vicinity of the target pixel so it may be more easily processed and recognized. A trainer then determines the identity of a knowledge element or knixel that corresponds to each pixel. This operation may be performed by having the trainer identify a window around an object within an image and identifying a knowledge element for that object so that each synaptic link generated for the pixels within the window is associated with the identified knowledge element. For example, an outline of a blood vessel may be defined within a digital image by a trainer and each synaptic link for each pixel within that window is associated with the knowledge element identified as a "blood vessel." This type of learning is called area learning.

A target learning mode may also be used. In this learning mode, the synaptic links within a window are mapped to a knowledge element, then all portions of the image which the trainer recognizes as corresponding to the knowledge element being learned by the system are blocked out and the synaptic links for the remaining pixels of the image outside the active window and blocked out regions are set to a knowledge element identifier that indicates the knowledge element is unknown. This process breaks the synaptic links generated for "noise" pixels within the active knowledge element window to the knowledge element identifier being learned. By repopulating the blocked out areas with image data and processing them, a set of synaptic links for the knowledge element being learned is developed that identify the objects corresponding to that knowledge element from different perspectives.

During a learning phase, a synaptic link may be generated for association with a knowledge element that differs from the knowledge element associated with the same synaptic link generated for another pixel. The system, in this case, notifies the trainer of this discrepancy and the trainer may resolve the discrepancy to identify a single knowledge element for the synaptic link. The process of identifying a single knowledge element for a synaptic link generated from pixel data within the image forms a synaptic array knowledge base for the system.

The relationship between synaptic links and a knowledge element is many to one. That is, more than one synaptic link value may be mapped to a knowledge element identifier. The knowledge element identifier is used to select an action that may modify the target pixel, generate data for a user, access an external system, or link to another knowledge element or theme.

Also during the training period, thematic elements are likewise identified by a trainer. Typically, these thematic elements are defined by a region of interest ("ROI") window that includes pixels associated with more than one type of knowledge element. That is, a theme is an object that is composed of other objects or knowledge elements. For example, an ROI window for a thematic element may include pixels that are associated with knowledge elements identified as hard tissue (bone), soft tissue, and blood vessels for medical images or runway lights, concrete and landing markers for a runway. The data structure for a thematic element includes a list of the associative links to various knowledge elements or themes for the thematic element. If the conditions of the associative links are met, then an action for a thematic element is performed. Actions for thematic elements correspond to the actions for knowledge elements discussed above.

The image processor of the system described above may be operated in accordance with the principles of the present invention to generate the knowledge bases for the image processor. In the training mode, the synaptic link generator generates a synaptic link for each pixel in a plurality of pixels in a digital image and a knowledge element identifier is stored in a location of the synaptic array corresponding to the generated synaptic links. The thematic identifier associates a plurality of knowledge elements to a thematic element with associative links. The actions stored in the knowledge element knowledge base and the thematic element knowledge base are defined by the trainer and stored in the knowledge bases. Once the system has been used to generate the knowledge bases for the image processing system, images may then be processed for detection of objects that correspond with one of the thematic elements in the thematic element knowledge base.

Processing of an image by the inventive image processing system includes the steps of defining an ROI window that is used to select pixels from a digital image. The associative links for the thematic element are processed by determining whether the knowledge element associated with each associative link meets the clustering criteria for knowledge elements and the logical functions defined by the form field of the associative link. The clustering criteria are set by a system or operator and may be selectively adjusted. If a correspondence is found between the relationship for each knowledge element type meeting the clustering criteria within an ROI window and the logical conditions for the associative links in the data structure identified for a thematic element are satisfied, then a theme is located within the ROI window. The action for the thematic element may then be performed. These actions may identify or highlight the theme in an image or generate some text appropriate for the theme detected within the image.

These and other advantages and benefits of the present invention may be ascertained from the detailed description of the invention in the accompanying drawings.

BRIEF DESCRIPTION OF THE DRAWINGS

The accompanying drawings, which are incorporated and constitute a part of the specification, illustrate preferred and alternative embodiments of the present invention and, together with a general description given above and the detailed description of the embodiments given below, serve to explain the principles of the present invention.

DETAILED DESCRIPTION OF THE INVENTION

Figure 1:
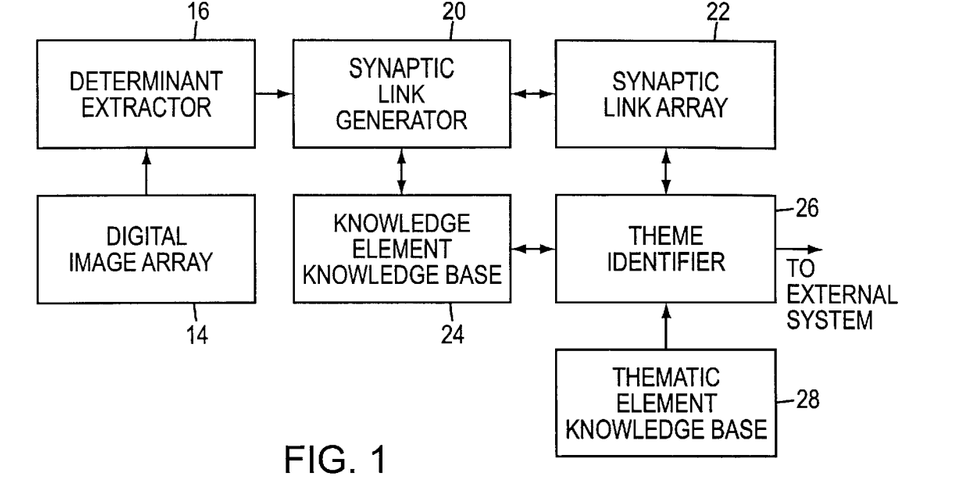
FIG. 1 is a block diagram of a system made in accordance with the principles of the present invention.

A system incorporating the principles of the present invention is shown in FIG. 1. System 10 includes an image storage array 14, a determinant extractor 16, a synaptic link generator 20, a synaptic link array 22, a knowledge element knowledge base or array 24, a theme identifier 26, and a thematic element knowledge base or array 28. Array 14 is used to store digital images that are processed by system 10. Determinant extractor 16 selects target pixels within an image stored in array 14 and extracts a set of determinants from the radial pixels associated with the target pixel. The computation of the determinants generally is discussed in more detail below with particular reference to the preferred determinants used for tissue abnormality detection. Synaptic link generator 20 uses the determinants computed for a target pixel to generate a synaptic link. A synaptic link is an unique identifier that identifies a knowledge element for a target pixel. Synaptic link array 22 is data storage for knowledge element identifiers having an address space as large as the range of synaptic links that may be generated by synaptic link generator 20. Knowledge element array 24 contains data storage having an address space that corresponds to the number of knowledge elements and the storage area corresponding to each address within the address space of knowledge element array 24 contains a knowledge element action and object. Theme identifier 26 identifies a theme in a digital image by evaluating the associations of a plurality of knowledge elements or other themes to a theme. The address space of theme array 28 corresponds to the number of themes that may be identified by system 10 and the storage allocation at each address is sufficient to contain a plurality of associative links for a theme. The associative links or association list entries for a theme are discussed in more detail below.

System 10, as shown in FIG. 1, may be used to encode pattern data regarding a region surrounding each target pixel within a digital image, use that encoded data to identify knowledge elements in the target pixel region, and identify themes in the image which are comprised of multiple knowledge elements. This system and its components may be used to process images regardless of the subject matter being imaged or the manner in which the images were generated. The components are adapted to different environments by the system training and the determinant selection.

System 10 and its components are preferably implemented on a single computer, although the various functions of image storage, determinant computation, synaptic link generation, and theme identification may be implemented on separate computers. Additionally, knixel knowledge base 24, synaptic link array 22 and thematic element knowledge base 28 may be stored and managed on separate storage systems or integrated into a single knowledge base. Preferably, the single computer system has a Pentium processor with at least 32 MB of RAM and a 1 GB hard drive. The display should be compatible with the resolution of the images system 10 is expected to analyze. Preferably, the software that implements the synaptic link generation, determinant computation and theme identification is written in the C programming language and for the Windows NT operating system environment. However, other programming languages and other operating system environments may be used.

To build a knowledge base for system 10, images containing variations on pixel pattern components are serially placed in array 14 and processed by system 10 in the training mode to establish the content of synaptic array 22, knowledge element knowledge base 24 and thematic element knowledge base 28. Many different images are used to present many various pixel pattern components to system 10 so statistically insignificant variant images of an object or pattern may be incorporated in the knowledge base of system 10. Building the content of these arrays is facilitated by a trainer. A trainer may be an individual who can discern structure within an image and identify knowledge elements and themes for system 10. Alternatively, the trainer may be another system 10 that has been trained so it may use its knowledge element array content and theme element array content to identify knowledge elements and themes for the system 10 being trained. The process for training system 10 to build the data content of knowledge element array 24 and theme array 28 is described in more detail below.

Figure 2:
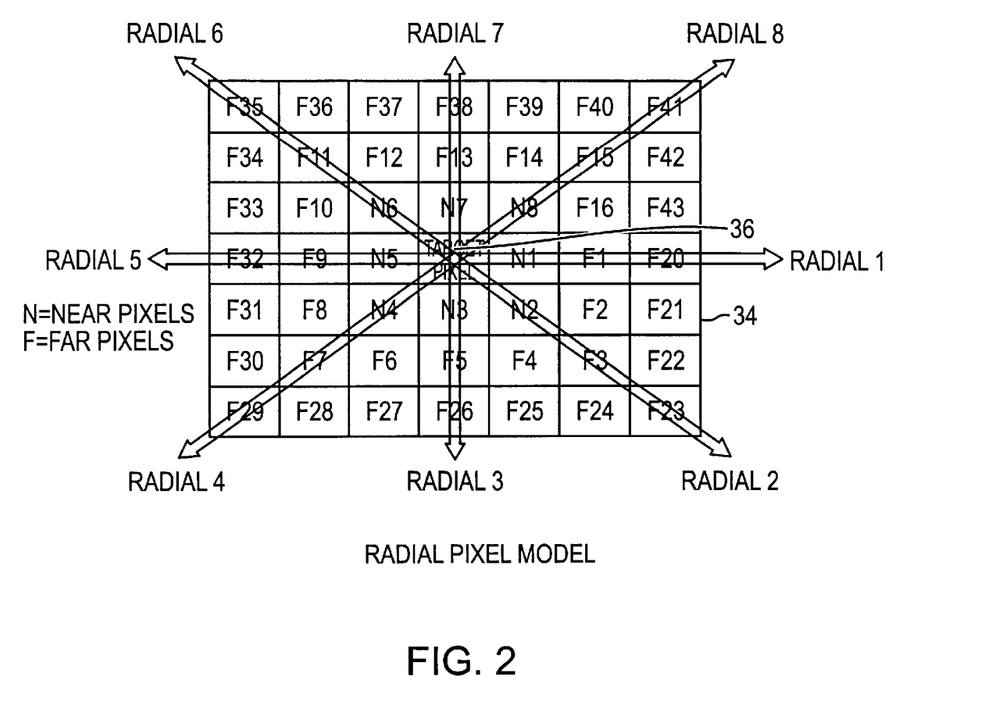
FIG. 2 is a depiction of a pixel region of a digital image centered about a target pixel.

Determinant extractor 16 selects a target pixel within a digital image stored in array 14 by preferably using a 7×7 data mask to select the first target pixel. This 7×7 data mask 34 is shown in FIG. 2 and the center pixel element 36 within this data mask is identified as the target pixel. In the Figure, each pixel within the target pixel region is identified by a number and a letter to uniquely identify the pixels.

Figure 3:
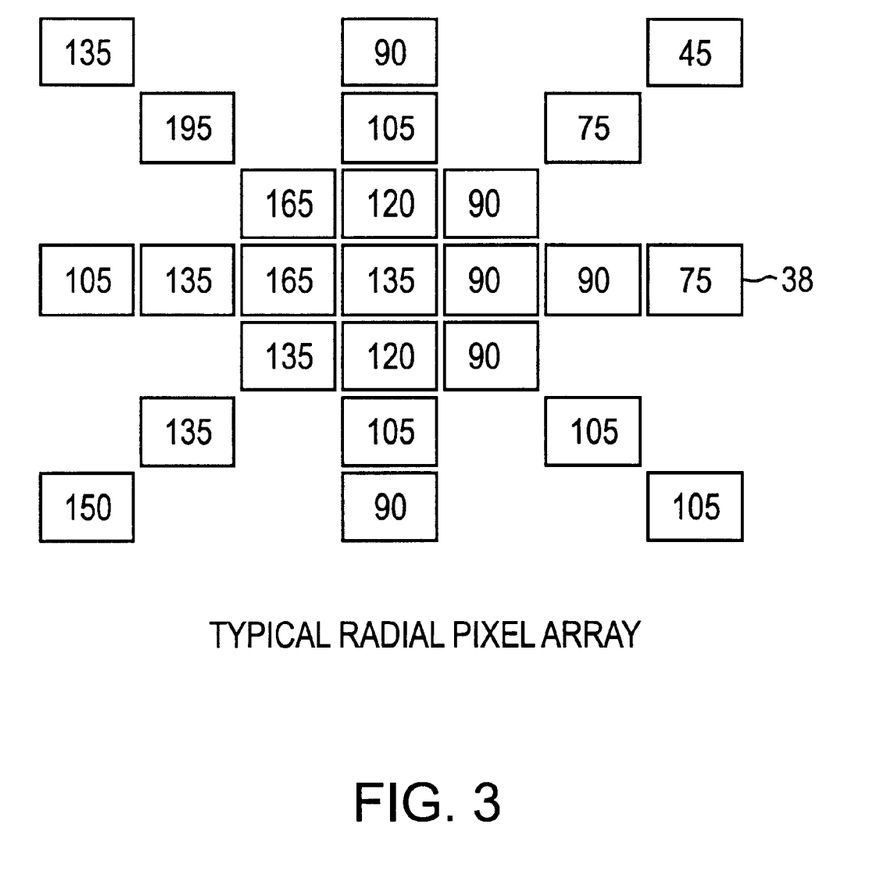
FIG. 3 is an illustration of the pixels within the target pixel region shown in FIG. 2 that are used for computation of determinants to encode relationship data for a target pixel.

Those pixels which have been determined to contribute the most meaningful data for encoding pattern information within the target pixel region are identified by the radial pixel array 38 shown in FIG. 3. The array as shown in FIG. 3 contains exemplary pixel data values represented in the figure by decimal numbers but, preferably, represented by binary numbers within array 14. Preferably, the pixel data stored in array 14 are luminance values for a color image generated by a imaging device (not shown). Thus, the values shown in FIG. 3 are luminance values. Rather than storing all of the pixels within the target pixel region or the radial pixel array for future reference, determinants have been identified that encode various aspects of pattern data in the radial pixel array. This use of determinants to encode the pattern component data about a target pixel permits system 10 to process images later presented to it without performing pixel by pixel comparisons with the pattern data used to train the system. A description of the target pixel region, the radial pixel array, and the purpose and computation of a number of determinants are set forth in U.S. Pat. No. 5,267,328 and the disclosure of that patent is hereby expressly incorporated by reference. The determinants identified in that patent as determinants 0, 1 and 2 are preferably used in an embodiment of system 10 that may be used to identify tissue abnormalities.

Figure 4:
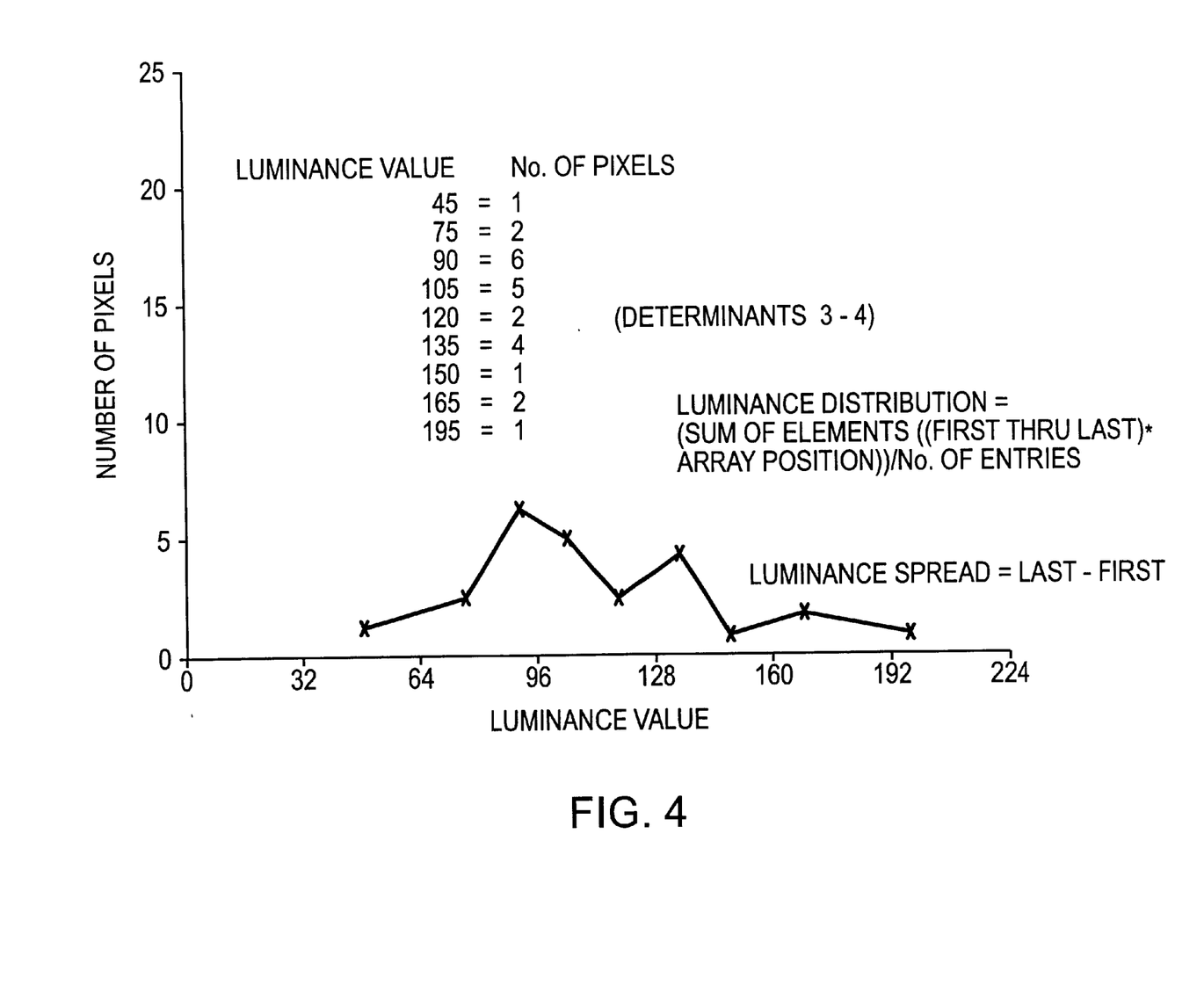
FIG. 4 is a graph demonstrative of the relationship incorporated within two determinants of the present invention.

In addition to the determinants identified above, an embodiment of the system of the present invention may include five other determinants that are computed from the pixels shown in FIG. 3. All determinants are used in concert to generate a synaptic link to a knowledge element that can be used to identify, for example, tissue abnormalities such as cancer. The relationship used to generate the determinants identified as determinants 3 and 4 are shown in FIG. 4. As shown in that Figure, the number of pixels for each luminance value within a radial pixel array for a target pixel are first identified. As shown in FIG. 3, there are nine luminance values within the radial pixel array that correspond to the twenty-four pixels contained within the radials of that array that emanate from the target pixel. As shown in the Figure, determinant 3 is called a luminance distribution which is expressed as:

Luminance distribution=(sum of elements ((First through Last)*Number of Occurrences))/No. of entries.

To compute this value, each luminance value is multiplied by the number of pixels having that value and these products are summed together. This sum is divided by the number of non-zero pixels because zero value pixels do not contribute to the determinant. Thus, the exemplary values produce a luminance distribution of (45+150+ . . . +195)/24.

The determinant denoted as determinant 4 is defined as:

Luminance Spread=Last–First

This value is the largest luminance value within the radial pixel array less the smallest luminance value in the radial pixel array. Using the exemplary values of FIG. 3, the luminance spread is 150. Determinant 3 provides the theoretical center of a curve representing the distribution of luminance in the radial pixel array and Determinant 4 indicates the relative homogeneity of the luminance with the radial pixel array.

Figure 5:
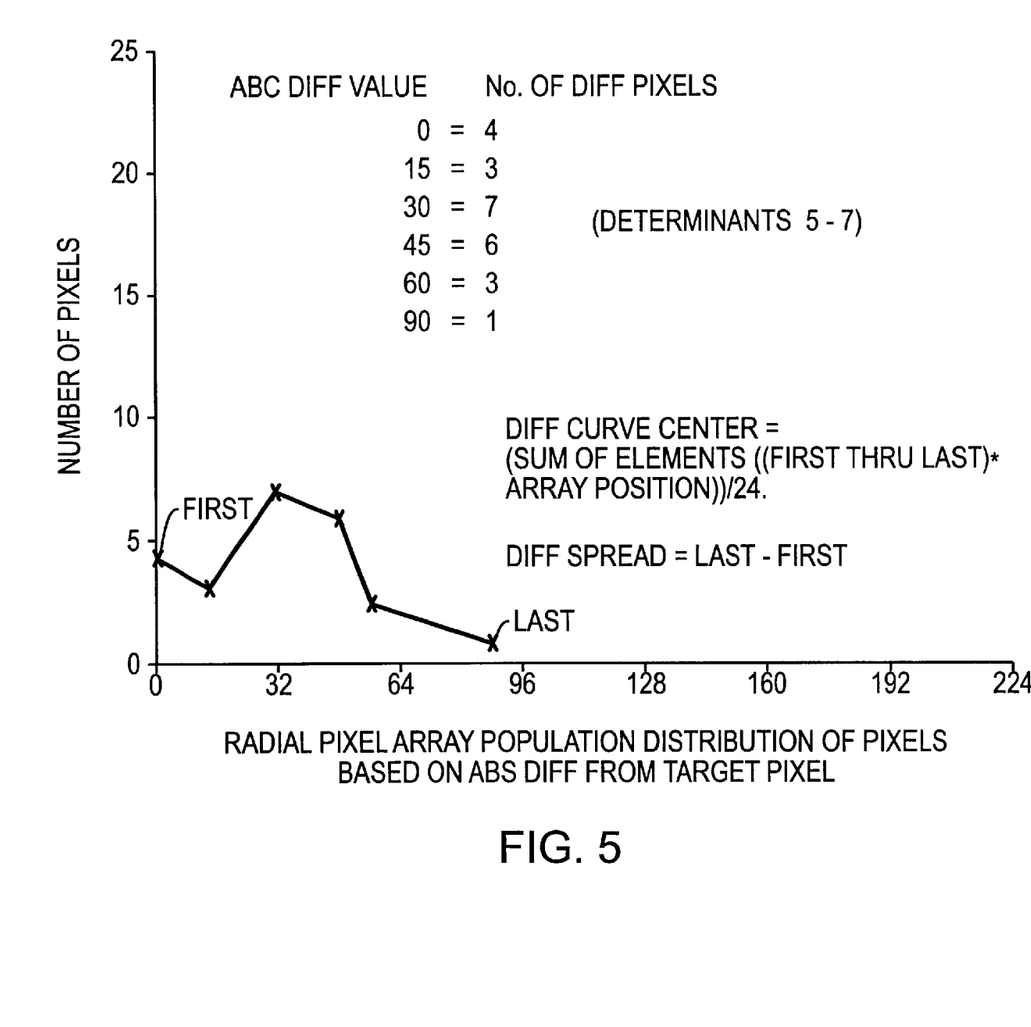
FIG. 5 is a graph of the relationship of three determinants used to describe data in the radial pixel area shown in FIG. 3.

The determinants which are denoted as determinant 5, determinant 6, and determinant 7, are described with reference to FIG. 5. As shown in the Figure, the absolute value of the difference between each non-target pixel in the radial pixel array and the target pixel is computed and the number of pixels corresponding to each absolute difference value is determined. The fifth determinant is computed as:

Absolute difference distribution=(sum of elements ((First through Last)*Number of Occurrences))/24

In this computation, the first value is the smallest absolute difference value and the last value is the largest absolute difference value. Again, the products of each difference and its number of occurrences are summed and then this sum is divided by the number of non-target pixels in the radial pixel array. The sixth determinant is the difference between the largest and smallest absolute difference value. In the example shown in FIG. 5 which is based on the luminance value shown in FIG. 3, the difference would be ninety (90). The seventh determinant is defined as the number of pixels not having a luminance value equal to the luminance value of the target pixel. In the example, determinant 7 would be twenty (20).

Figure 6:
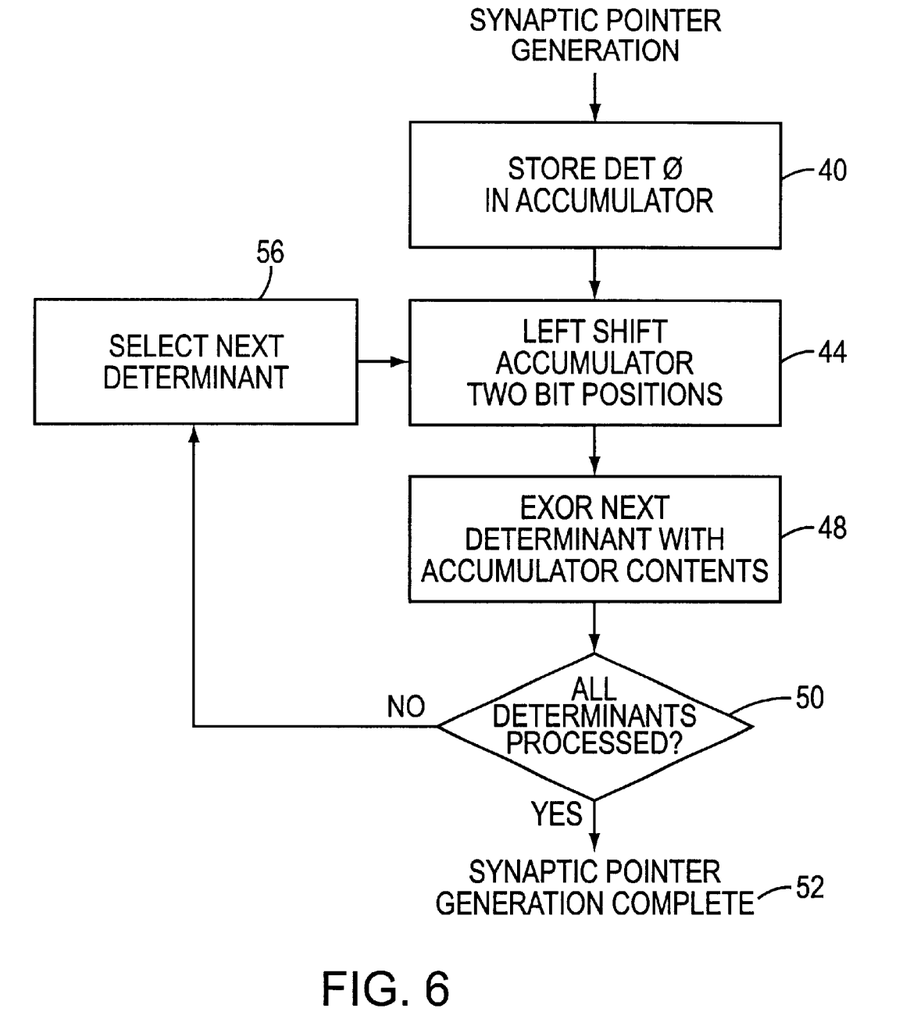
FIG. 6 is a flow chart of the process used to generate synaptic links.

Using determinants computed for the pixels in the radial pixel area surrounding a target pixel, synaptic link generator 20 generates a synaptic link for the target pixel. The process implemented by a computer program executed by synaptic generator 20 is shown in FIG. 6. The process begins by storing the value for determinant 0 in an accumulator in a right justified format for computation of the synaptic link (Block 40). The data within the accumulator is left shifted two (2) bit positions (Block 44). The value for the next determinant is then right justified with leading zeros and logically XOR'd with the accumulator contents (Block 48). The process then evaluates whether all determinants for a target pixel have been processed (Block 50) and if that is the case, the synaptic link generation is complete (Block 52). Otherwise, the value for the next determinant computed for the target pixel is selected (Block 56) and the computation of the synaptic links continues (Blocks 44–50).

Figure 7:
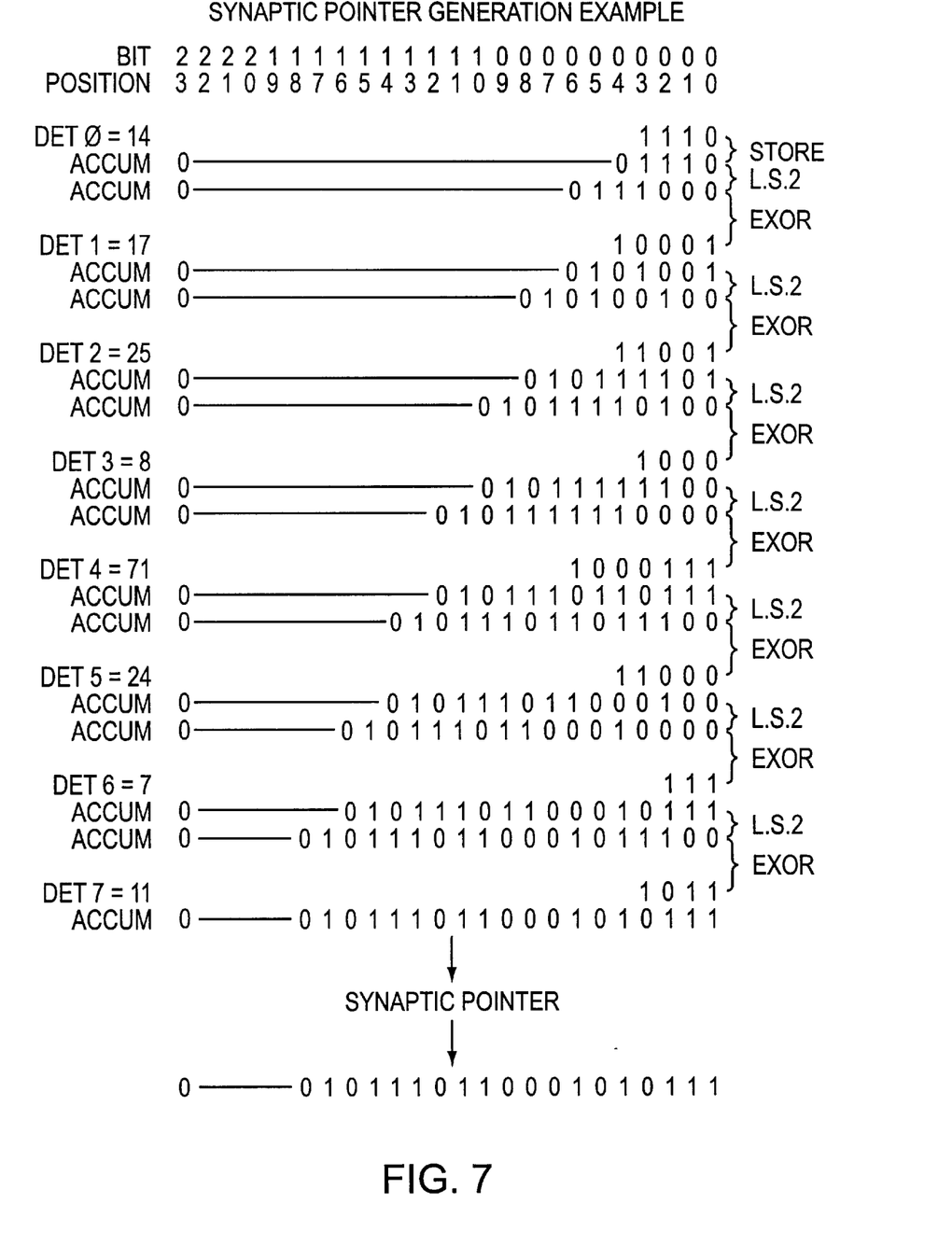
FIG. 7 is an example of the computation of a synaptic link.

An illustrative example of the generation of a synaptic link is shown in FIG. 7. In that figure, the following determinant values have been calculated:

| Determinant Identifier | Determinant Value |
|---|---|
| 0 | 14 |
| 1 | 17 |
| 2 | 25 |
| 3 | 8 |
| 4 | 71 |
| 5 | 24 |
| 6 | 7 |
| 7 | 11 |

The determinant values shown in this table are decimal values. In accordance with the process shown in FIG. 6, a binary representation of the decimal value 14 is right justified, loaded into an accumulator, and left shifted two positions. The data content of the accumulator is then XOR'd with the binary representation of the value of determinant 1. The result in the accumulator is then left shifted two positions and the binary representation of the next determinant is XOR'd with the value in the accumulator and that value is then left shifted two positions. This process continues until all eight determinants have been XOR'd into the previous result stored in the accumulator and left shifted two bits. The resultant value is the synaptic link. The purpose of generating a synaptic link is to form a data value that uniquely identifies the pattern data surrounding the target pixel. The pattern data surrounding the target pixel is preferably represented by determinants although other data representations may be used. Using the preferred determinants, the characteristics of the tissue imaged within a data mask (its homogeneity and type) are determined and stored. The preferred process for generating a synaptic link has been shown; however, other methods for generating unique identifiers from a set of data values such as those determined for the determinants may be used.

Figure 8:
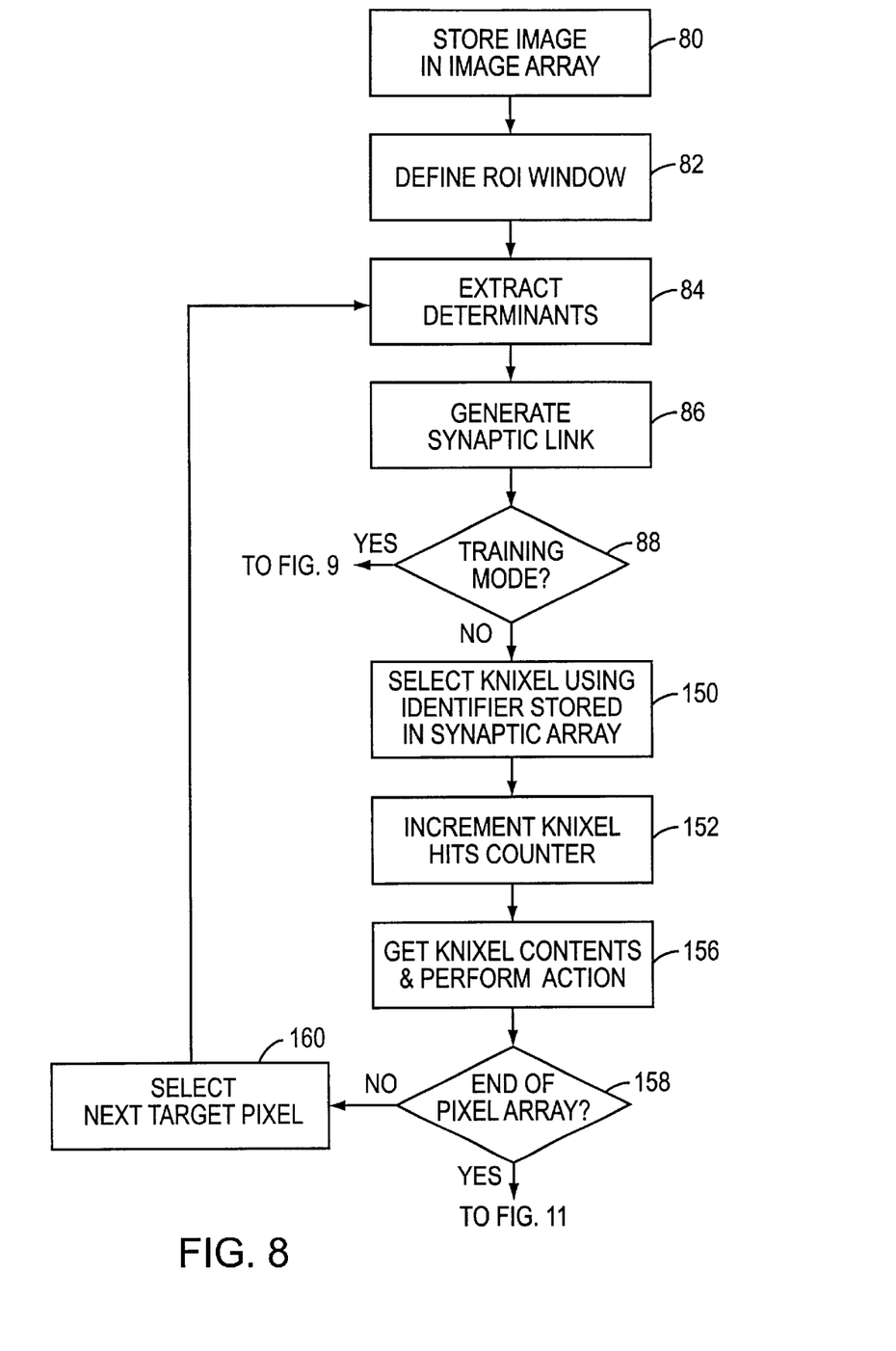
FIG. 8 is an image analysis process performed by the system shown in FIG. 1.

The process implemented by system 10 to train the system or process an image is shown in FIG. 8. The process begins by storing a digital image in image array 14 (Block 80). A region of interest (ROI) window is defined by the trainer for systems training, both knowledge element and theme, and image processing (Block 82). The ROI window may be as large as the image or cover a portion of it. The data mask is used to select a target pixel from the image data and determinants for the target pixel are preferably extracted from the radial pixel array associated with the target pixel (Block 84). The determinants are then used by synaptic link generator 20 to generate a synaptic link for the target pixel (Block 86). The system then determines whether it is in a training mode or not (Block 88).

Figure 9:
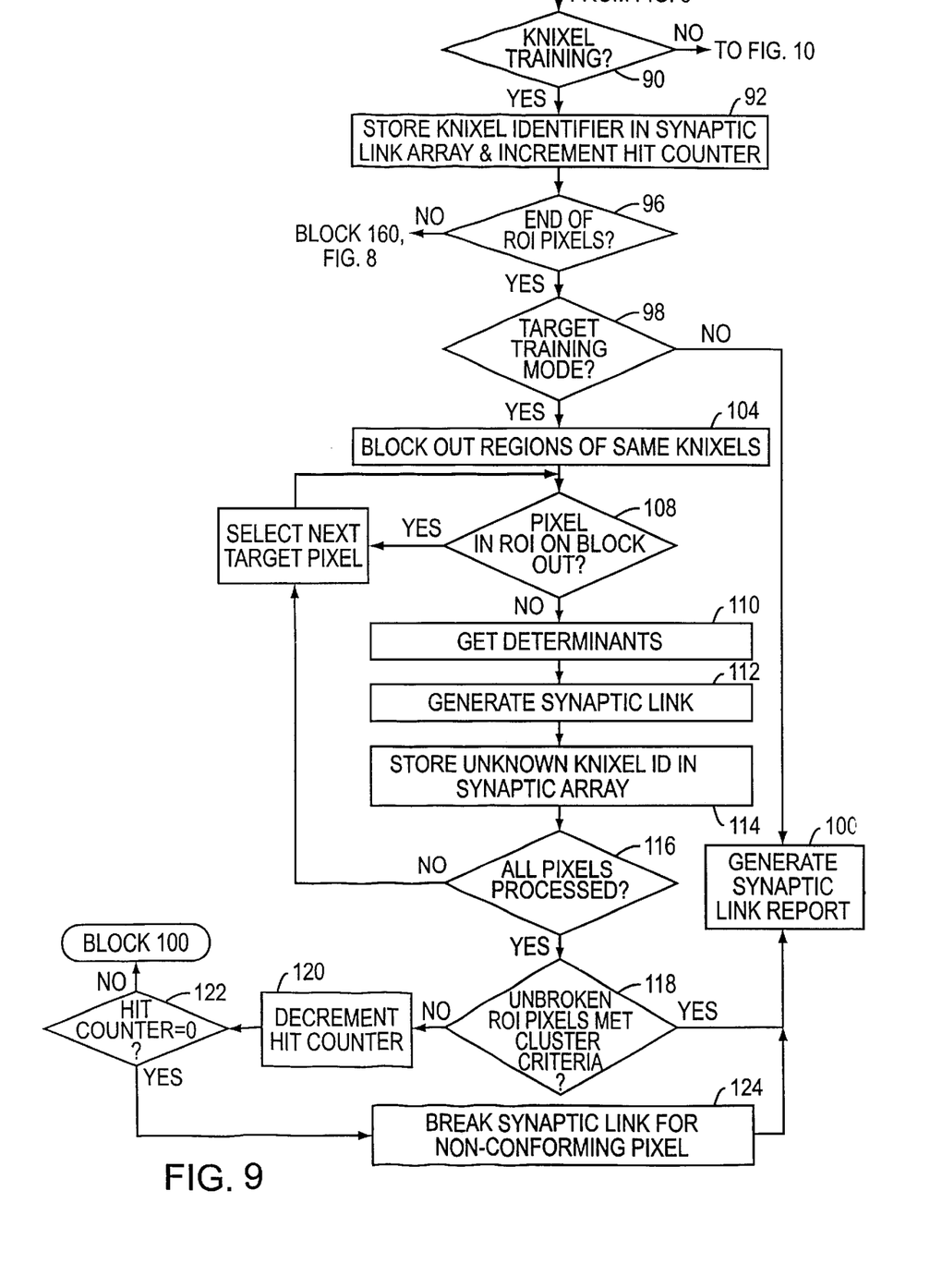
FIG. 9 is a flow chart of the training mode executed by the system shown in FIG. 1 for building the portion of the knowledge base associated with knowledge elements.

Discussion of the processing performed by system 10 continues with a description of the training mode processing shown in FIG. 9. System 10 first determines whether it is training for knowledge elements or themes (Block 90). If knowledge element training is being conducted, an identifier for the knowledge element is stored in synaptic array 22 at a location having an address that corresponds to the synaptic link and a hit counter is incremented (Block 92). As the preferred embodiment uses a synaptic link having 24 bits, the address space of the preferred embodiment is 16,777,216 locations. Depending on computational and storage resources available, the address space of synaptic array 22, knowledge element array 24, and thematic element array 28 may be other sizes. Preferably, each location within synaptic array 22 has sufficient storage for the knowledge element identifier, which preferably is sixteen (16) bits, and a knowledge element hit counter, which preferably is 32 bits. The process continues by determining whether another target pixel exists within the knowledge element ROI window (Block 96) and if it does, the process continues by selecting the next target pixel (FIG. 8, Block 84).

Once a synaptic link has been generated for each pixel within the knowledge element ROI window, synaptic link generator 20 determines whether target training mode is active (Block 98). If it is not, a report regarding the number of unique synaptic links that were generated from pixels within the knowledge element ROI window may now be generated (Block 100). This type of knowledge element training is known as area training. If target training mode is active, training continues by blocking out areas of the image that the trainer identifies as corresponding to the knowledge element for which the system is being trained (Block 104). "Block out" may mean altering the pixel values in an area to a pixel value that does not generate a synaptic link equal to a synaptic link generated for a pixel in the currently active knowledge element ROI window or it may mean that synaptic link generator 20 recognizes that pixels in the blocked out area are not processed in target training. A pixel other than one in the currently active ROI window or a blocked out region is then selected (Block 108) and the determinants for the pixel computed (Block 110). After the synaptic link is computed (Block 112), the knowledge element identifier for the unknown knowledge element, which, preferably, is zero, is stored in synaptic link array 22 at the synaptic link address (Block 114). This process continues until all of the image pixels outside the currently active ROI and blocked out areas are processed (Block 116). This process has "broken" those synaptic links for pixels within the ROI window that really do not correspond to the knowledge element for which the system is being trained. For example, an ROI window may closely conform to the outline of an electrical tower but grass or tree structure may also be included in the ROI window. Target training breaks the synaptic links for the tree and grass image pixels that had been linked to the electrical tower knowledge element.

The process continues by determining whether the pixels within the currently active ROI window that were not broken and remain identified as corresponding to the knowledge element for which the system is being trained meet the clustering criteria active for the training session (Block 118). Clustering criteria are selectively set by the trainer and define a constraint to prevent extraneous data from being identified as corresponding to a knowledge element. For example, if the cluster criteria is one (1), than a pixel must be within 1 pixel position of another pixel that corresponds to the same knowledge element. For those pixels not meeting the cluster criteria, the hit counter associated with the knowledge element is decremented (Block 120) and, if it is zero (Block 122), the unknown knowledge element identifier is stored at the address in the synaptic array corresponding to the synaptic link generated for that pixel (Block 124). This target training process filters out those synaptic links generated from pixels within a currently active ROI window that do not contain data for the knowledge element.

Figure 10:
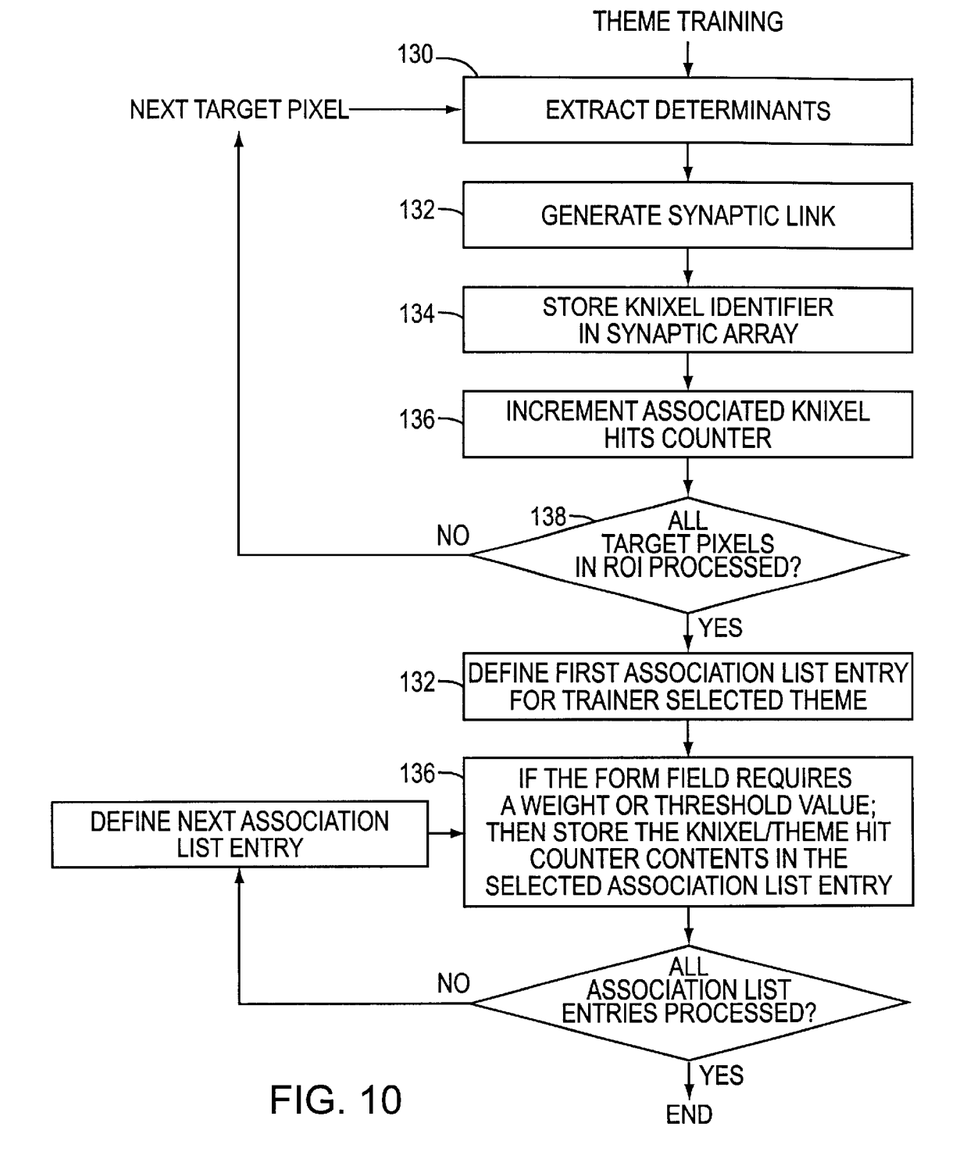
FIG. 10 is a flow chart of the process for building the portion of the knowledge base containing thematic element data.
Figure 11:
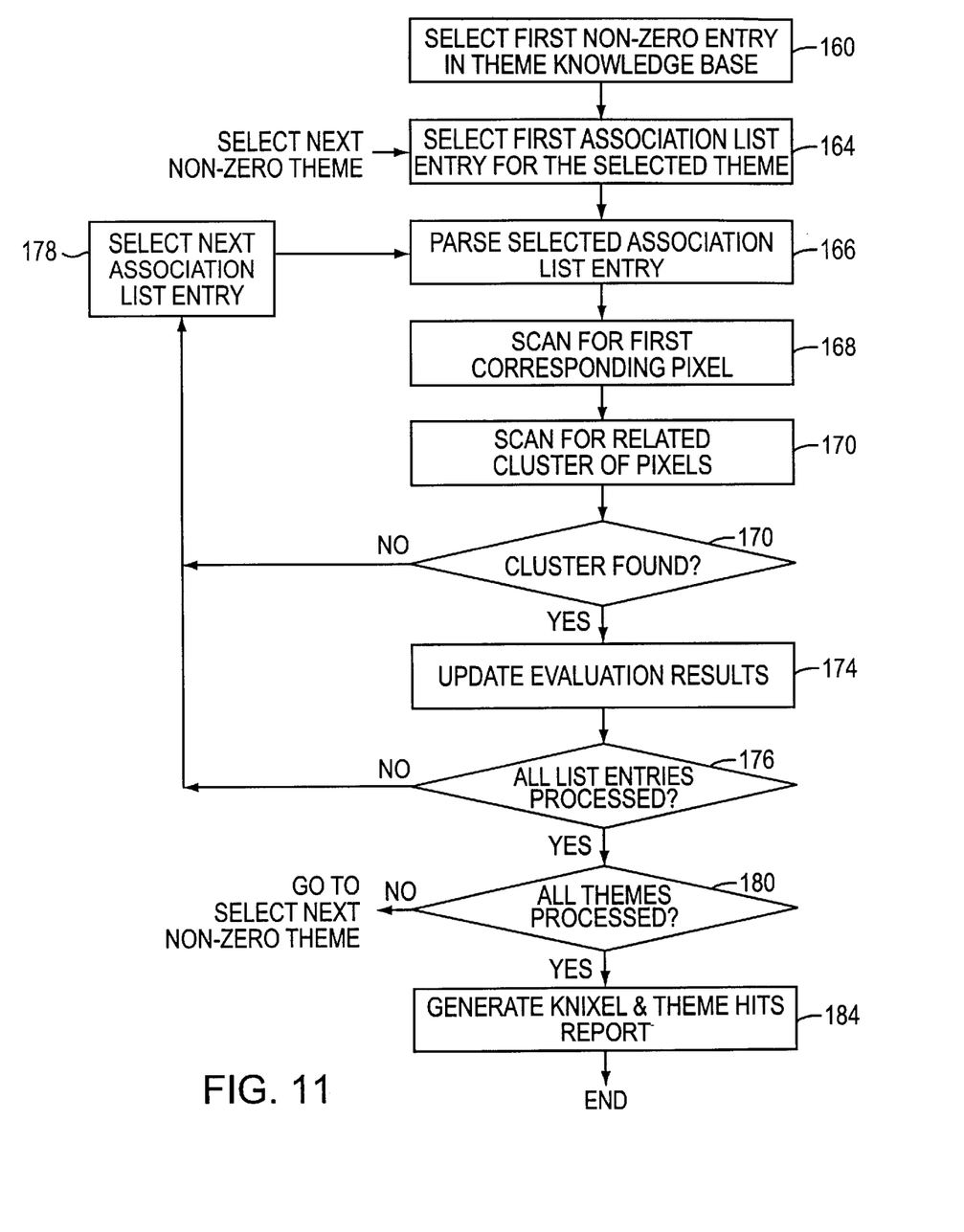
FIG. 11 is a flow chart of the process for evaluating thematic element correspondence.

If system 10 is set to a mode for theme training, the process of FIG. 9 continues with the theme training which is shown in FIG. 10. First, the determinants (Block 130) and synaptic links (Block 132) are generated for a target pixel and then the knixel identifier stored in synaptic array (Block 134) with the incremented hit counter (Block 136). This continues until all pixels with the ROI window are processed (Block 138). The trainer then defines the first association list entry for the theme to be the defined (Block 132). The association list entries have the structure shown in FIG. 12 and are discussed in more detail below. Because the trainer has trained the system to identify knowledge elements, the trainer selects those knowledge elements thought to uniquely comprise the theme and defines the knowledge element/theme identifier field of the association list entries. The trainer also defines the form field of the association list entries. The form field and its data content are defined in more detail below. The process then uses the synaptic link for each pixel within the ROI window to identify the corresponding knowledge element and its associated hit counter. If the form field requires a threshold or weight value, the hit counter is stored in the threshold/weight field (Block 140). If all association list entries have been defined, then the training stops (Block 142). Otherwise, the next associative link is defined (Block 144) and the process continues. Preferably, up to eight (8) associative links may be defined. The trainer can select other areas corresponding to the same theme and refine the definition of the association list entries or define new themes. Once the trainer has finished defining themes for theme knowledge base 28, the theme training process is complete.

When an image is being processed to detect objects in the image, the processing of FIG. 8 is performed and system 10 is determined to not be in the training mode (Block 88). In that event, the knowledge element identifier at the address specified by the synaptic link is retrieved from synaptic array 22 (Block 150). A counter associated with that knowledge identifier is incremented (Block 152). The action associated with the selected knowledge element is then performed (Block 156) and the process determines whether the last target pixel has been processed (Block 158). If the data mask can be moved to identify another target pixel, the target pixel is identified and processing continues (Block 84). If each pixel within the image eligible to be a target pixel has been processed and the actions for each knowledge element associated with the target pixels performed, the image is evaluated for themes.

The theme evaluation process is shown in FIG. 1. The first non-zero theme in the theme knowledge base is selected (Block 160). The first association list entry or associative link is selected (Block 164) and parsed to identify the knowledge element or theme identified by the association list entry (Block 166). Preferably, themes are stored in an order within the knowledge base so that themes required for other themes are processed first. The process now scans the image within the current ROI window for a pixel corresponding to the knowledge element identified in the association list entries (Block 168). Once the first such pixel is found, the process searches for another such pixel within a range that corresponds to the cluster criteria. If such a pixel is not found, the pixel is deemed to be noise or a random piece of data and is ignored. If two pixels corresponding to the knowledge element meet the cluster criteria, the X coordinates of the two knowledge elements are averaged together and the Y coordinates of the two knowledge elements are averaged together. The resulting coordinates define a center of the cluster. The process continues by searching for knowledge elements that meet the clustering criteria and the value of the center of the cluster location is continually updated. Once the cluster criteria is not met, a cluster of pixels corresponding to the first knowledge element has been located (Block 170). The form field of the association list entry is now parsed to determine whether it requires a threshold to be met. If it does, the hit counter indicating the number of knowledge elements in the cluster is compared to the threshold in the association list entry. The logic identified by the form field is evaluated to determine whether the relationship defined by the associative link is true. The theme evaluation results are updated (Block 174).

If more association links require processing (Block 176) then the next association list entry is then retrieved for processing (Block 178). When the last association list entry has been processed, clusters for each knowledge element associated with a theme have been identified and the center of each cluster computed. If the logic conditions for a theme are met, the theme is activated, the action stored in the theme array entry is executed and the theme hit counter incremented. The process verifies whether all pixels within the theme window have been processed and if not, the remaining pixels are evaluated for more occurrences of the current theme. If the theme is not presented, the process checks for more themes to process (Block 180) and theme evaluation continues (Block 164). If all themes have been evaluated, a hits report is generated (Block 184). The theme window may now be moved and the themes evaluated for the new region. When the theme window is not moved to identify new theme regions for evaluation, image processing is finished.

Figure 12:
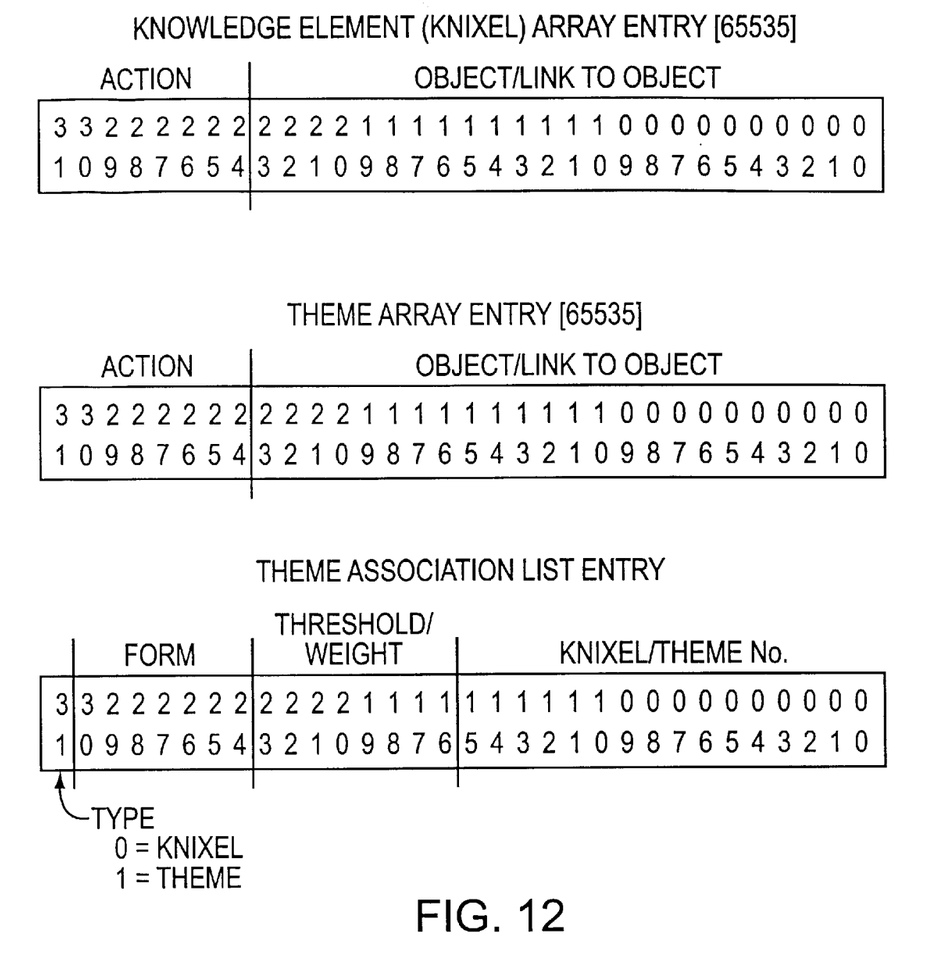
FIG. 12 is a depiction of the data structures within the knowledge element knowledge base and thematic knowledge base of FIG. 1.

FIG. 12 shows the structure of the data records in knowledge element knowledge base 24 and thematic element knowledge base 28. Knowledge element array entry 200 includes an action field 204 and an object field 206. Action field 204 defines an action to be performed when a knowledge element identifier corresponding to the address location in knowledge element array 24 is retrieved from synaptic link array 22. The action is defined by a user to be one appropriate for each knowledge element as identified by the system trainer. A limited number of actions are necessary for cancer detection, feature extraction and object recognition in ultrasound, radar, and other image modality images. This number is limited by the computational and communication resources available for the implementation of system 10. Preferably, four actions are used in an embodiment of system 10 that may be used to detect cancer in the images of in vivo tissue. The four actions preferred for this application are the replace action, knowledge element link, database link and thematic link; however, these actions as well as others may be used to analyze ultrasound, radar, infrared and other digital images in a wide variety of application fields.

The replace action causes the data stored in object field 206 to be placed in the data location of the pixel value that identified the knowledge element. This new data value, for example, may highlight the knowledge element in the image. The knowledge element link action uses the data within object field 206 as a knowledge element identifier and processing of that knowledge element data record is performed. The database link action uses the data within object field 206 as a key that is passed, preferably, to a relational database manager which uses the key to execute or provide the value associated with the key to the user of system 10. Preferably, the value in the relational database is text. For example, known databases written for the Access language of Microsoft Corporation are publicly available that contain data for medical records. Thus, a knowledge element corresponding to a diagnostic code may be used to retrieve text data from the database. The thematic element link operates like the knowledge element link except object field 206 contains a theme identifier. Thematic element data record 208 also has an action 204 and object field 206, and although it may have different actions than knowledge element data record 200, it preferably uses the same type of data.

Before an action for a thematic element data record 208 is performed, each theme association list entry 210 associated with a thematic element is evaluated. Preferably, eight (8) association list entries 210 are associated with each thematic element, although fewer or more list entries may be used depending upon available memory. The theme association list entry includes a theme/knowledge element flag 212, form field 214, a threshold/weight field 216, and a knowledge element/theme identifier field 218. To evaluate an association list entry, form field 214 is parsed to determine the form of the association. Although fewer or more logical association forms may be used, the preferred forms are AND, OR, NOT, XOR, threshold AND, threshold OR, threshold NOT, threshold XOR, weighted AND, weighted OR, weighted NOT, and weighted XOR. A threshold logical association means that the knowledge element or theme identified in field 218 must meet or exceed the hit count contained in threshold/weight field 216 before the Boolean operator defined in form field 214 is used to evaluate the other list entries. Weighted logical associations mean that the knowledge element or theme defined by the list entry is given the weight defined by field 216 in the logical evaluation of the list entries. The Boolean logical operations are used to determine whether all, some, the absence or mutually exclusive presence of the knowledge elements/themes defined by the list entries are required before the theme corresponding to the theme entry record is activated and its action performed. Theme/knowledge element flag 212 identifies whether field 218 contains a knowledge element or theme.

Figure 13:
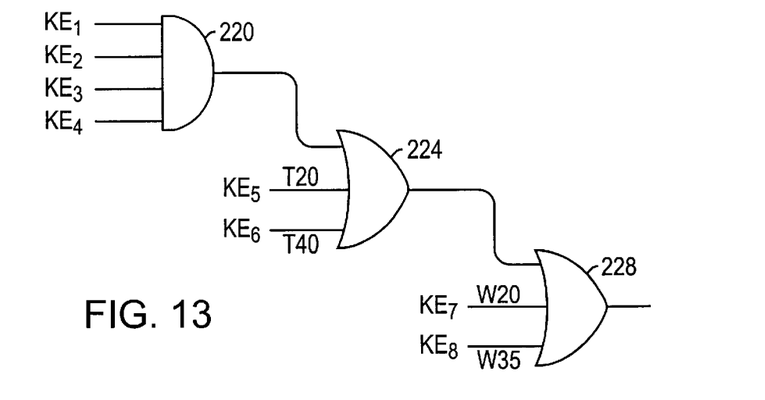
FIG. 13 is a logic diagram of an example corresponding to an associative link structure for a theme.

FIG. 13 shows a logical gate construction that is used as an example to explain the operation of association list entries 1–8 that associate knowledge elements 1–8 to the theme of this structure. In this example, four (4) association list entries for knowledge elements 1–4 have a simple AND form. If all four elements are present, then the theme may be activated and AND gate 220 represents this logical operation. OR gate 224 has as its input the output of AND gate 220 and the two knowledge elements 5 and 6 requiring a threshold OR operations. In the example, knowledge element 5 must meet or exceed a threshold of 20 hits before it can activate OR gate 224 while knowledge element 6 must meet or exceed a threshold of 40 hits before it can activate gate 224. Thus, gate 224 can activate the theme if knowledge elements 1–4 are all present or knowledge element 5 meets or exceeds its threshold or knowledge element 6 meets or exceeds its threshold. OR gate 228 has as its inputs the output of gate 224 and the weighted input of knowledge element 7 and knowledge element 8. If knowledge element 7 is present, it is given a weight of 20% while knowledge element 8 is given a weight of 35%. Thus, the presence of knowledge element 7 or knowledge element 8 alone is insufficient to activate gate 228 as neither one may provide a simple majority of the weighted inputs. However, if both knowledge element 7 and knowledge element 8 are active, then their combined weighted input is 55% which is more than a simple majority and gate 228 is activated. In effect, the output of gate 224 is given a weight of at least 51% as its presence alone is sufficient to activate gate 228. Thus, the logic diagram depicted in FIG. 13 represents a structure of eight association list entries for a theme to identify whether a theme is active within a theme ROI window.

While the present invention has been illustrated by the description of the preferred and alternative embodiments and while the embodiments have been described in considerable detail, it is not the intention of the applicants to restrict or anyway limit the scope of the appended claims to such detail. Additional advantages and modifications will readily appear to those skilled in the art. The invention's broader aspects are therefore not limited to the specific details, represented apparatus and method, and illustrative example shown and described. Accordingly, departures may be made from such details without departing from the spirit or scope of applicant's general inventive concepts.

What is claimed is:

1. A digital image processing system comprising:
   a knowledge base of themes, the themes in the knowledge base being coupled to knowledge elements by associative links;
   a synaptic link generator for generating synaptic links for pixels in a digital image, each synaptic link identifying a knowledge element for a corresponding pixel; and
   a theme identifier for evaluating associative links for a plurality of knowledge elements corresponding to a theme to determine whether the corresponding theme is present in the digital image being processed.

2. The system of claim 1, the theme identifier also evaluating an associative link for at least one theme corresponding to the theme being evaluated by the theme identifier.

3. The system of claim 1, said synaptic link generator including a determinant extractor for computing a set of determinants for a pixel; and
   means for encoding the determinants to generate the synaptic link corresponding to the pixel.

4. The system of claim 1, said theme identifier including:
   means for evaluating a logical relationship between knowledge elements identified by the associative links for a theme, and
   means for performing an action in response to said logical relationship means determining the logical relationship identified by the associative links indicates the theme is present in the digital image.

5. The system of claim 1, the performing action means including:
   means for substituting a value for all pixels corresponding to the identified theme;
   means for accessing an external resource;
   means for linking the evaluating means to another knowledge element within a knowledge element knowledge base; and
   means for linking the evaluating means to another theme within the knowledge base.

6. The system of claim 1, the synaptic link generator including:
   means for storing a knowledge element identifier at an address corresponding to a generated synaptic link to form a correspondence between a knowledge element and a pixel in the digital image.

7. The system of claim 5, the synaptic link generator including:
   means for comparing locations of pixels corresponding to an identified knowledge element to a clustering criteria to determine whether the knowledge element identifier storing means stores the knowledge identifier at the address corresponding to a generated synaptic link.

8. The system of claim 5, the synaptic link generator including:
   means for breaking a synaptic link between a pixel and a knowledge element, the breaking synaptic link means breaking the synaptic link in response to generated synaptic link in a portion of the digital image outside a knowledge element window corresponding to a synaptic link generated for a pixel within the knowledge element window.

9. A method for detecting objects and patterns in a digital image comprising the steps of:
   generating a synaptic link for each pixel within a plurality of pixels within a digital image; and
   evaluating associative links between a theme and a plurality of knowledge elements to determine whether the theme is present in the digital image.

10. The method of claim 8 further comprising the steps of:
    extracting a set of determinants for each pixel in said plurality of pixels for the generation of the synaptic links; and
    encoding the set of determinants to generate the synaptic link.

11. The method of claim 8 further comprising the steps of:
    evaluating a logical relationship defined by the associative links between knowledge elements and the theme; and
    performing an action in response to the logical relationship being true.

12. The method of claim 10, said performing action step being comprised of the step of performing one of a value substitution, external resource access, a knowledge element link or a theme link in response to the logical relationship being true.

13. The method of claim 8 further comprising the step of:
    storing a knowledge element identifier at an address corresponding to each generated synaptic link.

14. The method of claim 12 further comprising the step of:
    comparing locations of pixels corresponding to an identified knowledge element to a clustering criteria to determining whether the knowledge element identifier is stored at the address corresponding to the generated synaptic link.

15. The method of claim 12 further comprising the step of:
    breaking a synaptic link between a pixel and a knowledge element in response to a generated synaptic link in a portion of the digital image outside a knowledge element window corresponding to a synaptic link generated for a pixel within the knowledge element window.

16. The method of claim 8 further comprising the step of weighting the logical relationship defined by an associative link for a knowledge element in the evaluation of associative links for a theme.

17. The method of claim 8 further comprising the step of:
    comparing a hit counter for a knowledge element identified by an associative link for a theme to a threshold identified by the associative link in the evaluation of associative links for a theme.

* * * * *